United States Patent [19]

Hong

[11] 3,769,712
[45] Nov. 6, 1973

[54] THEORETICAL OUTSIDE DIAMETER ANVILS

[76] Inventor: Kyung J. Hong, 1140 S. Ardmore Ave., Los Angeles, Calif. 90006

[22] Filed: Feb. 14, 1972

[21] Appl. No.: 225,885

[52] U.S. Cl. .................................. 33/164 R, 33/167
[51] Int. Cl. .............................................. G01b 3/18
[58] Field of Search ...................... 33/143 R, 147 R, 33/164 R, 163, 167, 174 E

[56] References Cited
UNITED STATES PATENTS

| 643,080 | 2/1900 | Boulet | 33/167 |
|---|---|---|---|
| 3,327,399 | 6/1967 | Gershman | 33/164 R |
| 2,731,825 | 1/1956 | Levan | 33/174 E |
| 2,410,571 | 11/1946 | Easton et al. | 33/167 |
| 2,490,376 | 12/1949 | Rupley | 33/174 E |

Primary Examiner—Stanley N. Gilreath
Assistant Examiner—Jon W. Henry

[57] ABSTRACT

A set of special anvils for comparators of micrometer type or dial indicator type to measure a theoretical outside diameter of a countersunk head bolt, to measure a head protrusion, and to compare the head protrusion of a countersunk head bolt with a master gauge are provided. The anvils for comparators are designed specially for the above-mentioned purpose by using a theoretical triangle on the head of the countersunk head bolt. The head of the countersunk head bolt is inserted between a set of anvils and hold by the anvils to be measured.

1 Claim, 11 Drawing Figures 3,769,712

THEORETICAL OUTSIDE DIAMETER ANVILS

BRIEF SUMMARY OF THE INVENTION

This invention is directed to a set of theoretical outside diameter anvils for comparators of micrometer type or dial indicator type to be used for measuring a theoretical outside diameter of a countersunk head bolt or a head protrusion and for comparing the head protrusion of a bolt with a master gauge. A pair of theoretical outside diameter anvils (also called head protrusion comparator anvils) are attached to the non-rotating spindle micrometer or to the dial indicating comparator. The theoretical outside diameter anvil is of "c" shape and open-ended spherical and has two contact surfaces with an angle of a certain degree according to the head angle of a countersunk head bolt. Between the two contact surfaces of one anvil, one side of the head of a countersunk head bolt is inserted and the other anvil on the spindle is closed in by means of turning the thimble of micrometer comparator or releasing the lever of the dial indicating comparator till the other side of the head is inserted between the two contact surfaces and the two anvils hold the head of the bolt tight. Then, the theoretical outside diameter of the head is read at the graduated thimble and the graduated barrel sleev on the micrometer type comparator or at the indicating window and the dial indicator on the dial indicating type comparator.

Since the sharp edge of outside head of the countersunk head bolt has to be broken off, it is impossible to use a conventional micrometer to measure a theoretical outside diameter of the head. Currently, one existing method to measure the theoretical outside diameter of head depends on using an optical comparator. But the defect of using the optical comparator to measure the theoretical outside diameter of head is that it takes too much time to measure with it and is not suitable for mass production.

And an existing method of comparing the head protrusion with a master gauge or measuring a head protrusion is to use head protrusion blocks of different inside diameter for different size countersunk head bolts, tri-pot indicators, and a master gauge. This method needs large number of blocks and takes time to set up the gauge.

Using the Theoretical Outside Diameter Anvils attached non-rotating spindle comparators of micrometer type or dial indicating type directing this invention, the theoretical outside diameter of a countersunk head bolt can be measured easily and accurately without consuming time. Also, without preparing large number blocks and spending too much time to set up the gauge, we are able to compare a head protrusion accurately with a master gauge or measure a head protrusion using the theoretical outside diameter anvils attached non-rotating spindle comparators.

DETAILED DESCRIPTION

Figure 1:
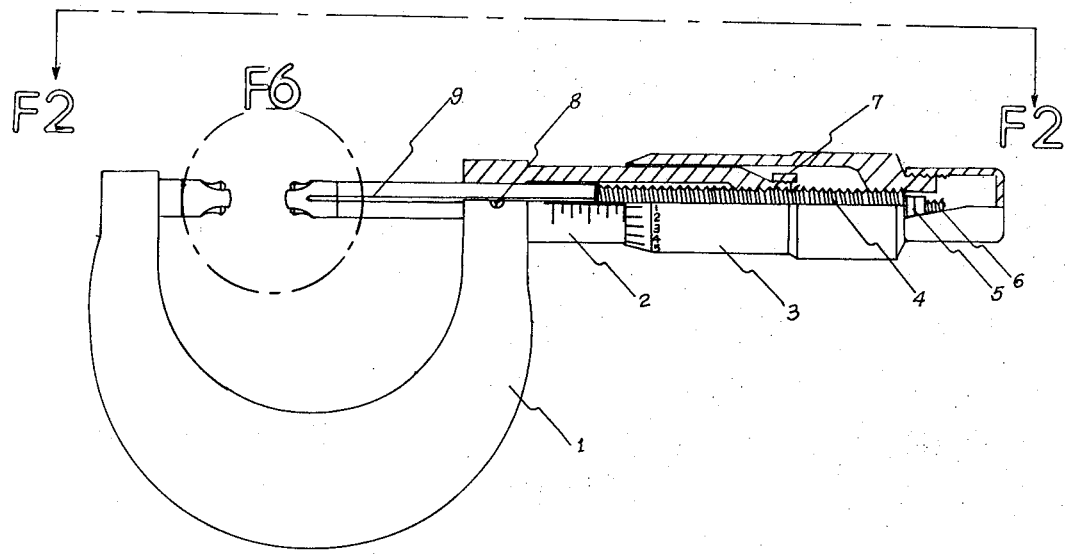
FIG. 1 is a cutaway view of a set of theoretical outside diameter anvils attached non-rotating spindle micrometer type comparator, showing the detailed parts of micrometer.
Figure 2:
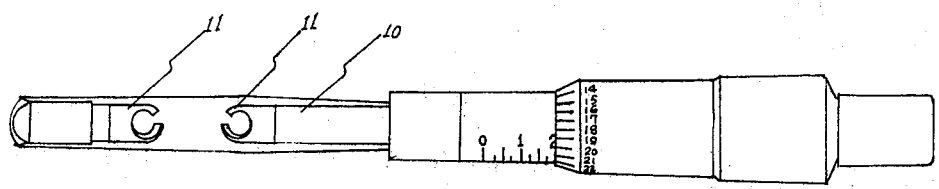
FIG. 2 is a view of the comparator taken in the direction of F2—F2 in FIG. 1.

A set of theoretical outside diameter anvils 11 are designed and attached to the non-rotating spindle micrometer or to the dial indicating comparator to be used for measuring a theoretical outside head diameter of a countersunk head bolt or for measuring a head protrusion and comparing the head protrusion of a countersunk head bolt with a master gauge. (ref. FIG. 1, 2, 3, 4, and 5) The non-rotating spindle micrometer comprises a frame 1, a graduated barrel sleev 2, a graduated thimble 3, a measuring screw 4, a stop nut 5, a spindle screw 6, an adjusting nut for thread wear 7, a spindle guide screw 8, a spindle guide screw way recess 9, and a non-rotating spindle 10. (ref. FIGS. 1 & 2)

Figure 3:
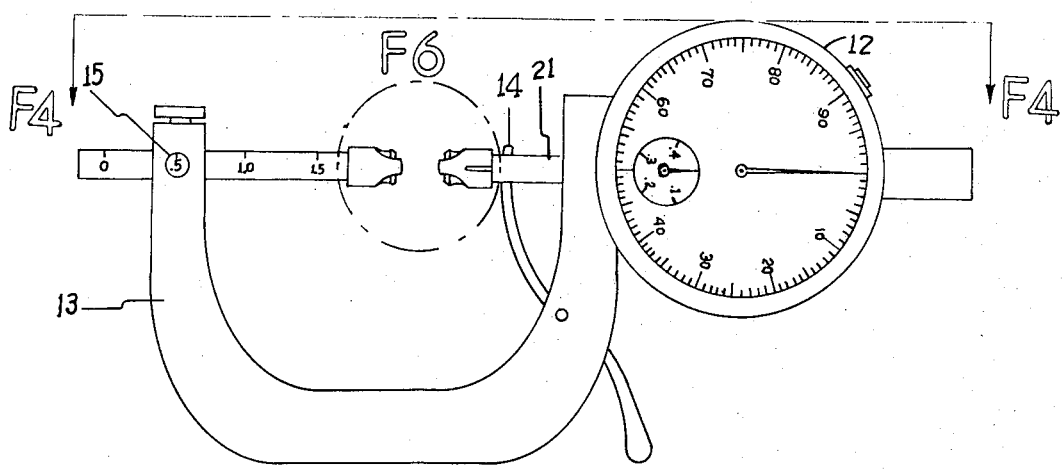
FIG. 3 is a view of the theoretical outside diameter anvils attached dial indicating comparator with a lever.
Figure 4:
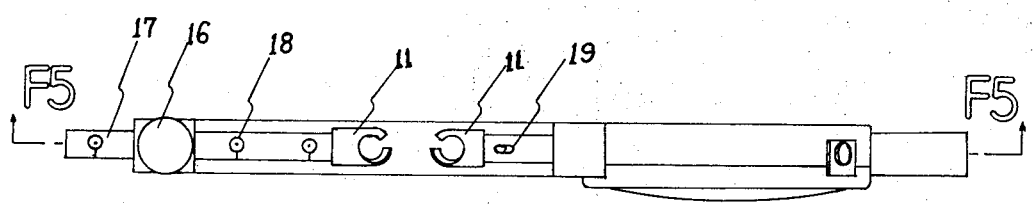
FIG. 4 is a view of the comparator taken in the direction of F4—F4 in FIG. 3.
Figure 5:
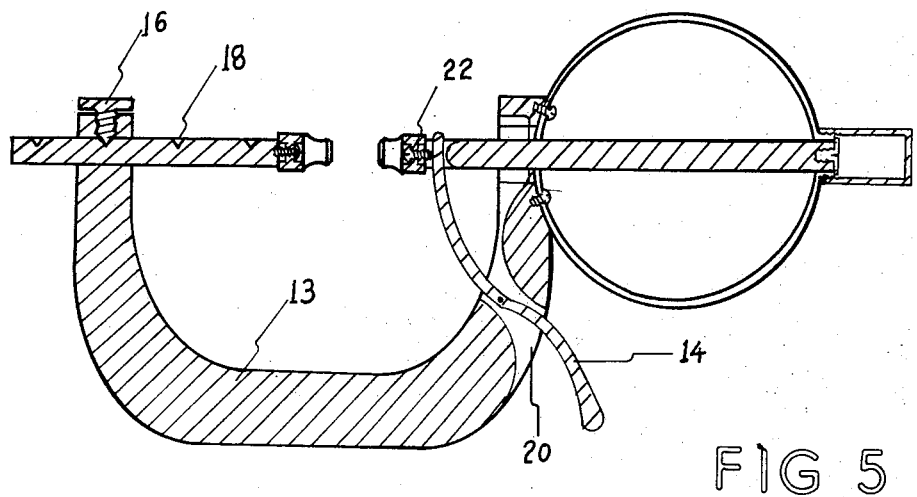
FIG. 5 is a cutaway view of the dial indicating comparator taken in the direction of F5—F5 in FIG. 4, showing the lever and the way of attaching the anvils to the spindle and the rod.
Figures 6, 7:
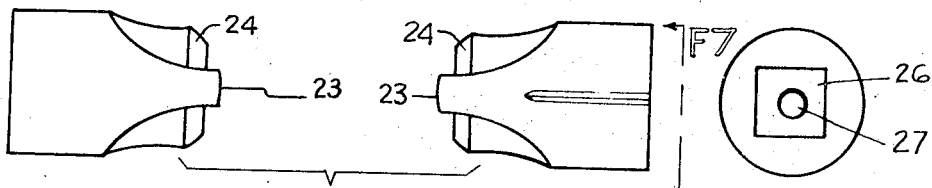
FIG. 6 is an enlarged view of a set of theoretical outside diameter anvils in the circled portion, F6, in FIG. 1 and FIG. 3.
FIG. 7 is a view of the end of the anvil taken in the direction of F7—F7 in FIG. 6, where it is attached to the spindle or the rod.

And the dial indicating comparator comprises a 0.500 inch dial indicator 12, a frame 13 with an indicating window 15 and a lever house 20, a lever 14, a stop nut 16, a graduated rod 17 with stop nut notches 18, a spindle 21 with a lever hole 19, and anvil attaching screws 22. (ref. FIGS. 3, 4, and 5)

Figure 8:
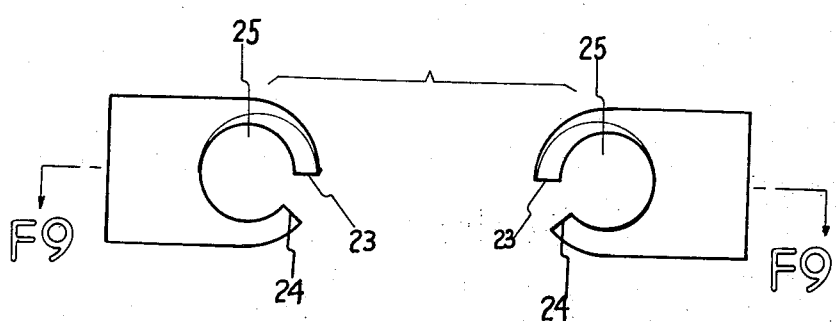
FIG. 8 is an enlarged side view of a set of theoretical outside diameter anvils of FIG. 6, showing the angle between the contact surfaces and hollows inside of the anvils.

Each of the theoretical outside diameter anvils has two contact surfaces 23 & 24 which are smooth and flat. The top contact surface 23 is narrow to give an accuracy and wide enough to hold the balance of the head of a bolt and the bottom contact surface 24 is wider to hold the conical surface of the head of a bolt easily. And there is a hollow 25 inside of the anvil to avoid a possible contact with any defected portion on the outer edge of the head. (ref. FIG. 8)

Figures 9, 10:
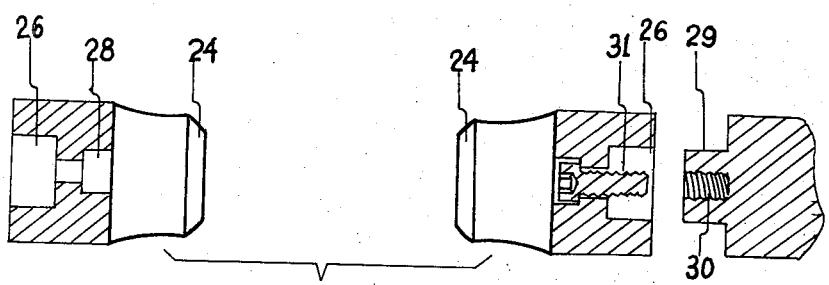
FIG. 9 is a cutaway view of a set of theoretical outside diameter anvils taken in the direction of F9—F9 in FIG. 8, showing the wat to attach them to the spindle and the rod.
FIG. 10 is a cutaway view of the spindle end showing the anvil adaptor.

At the end of an anvil, there is a square recess 26 with an attaching screw hole 27 and a counter bore 28 for the screw head. The anvil is attached to the adaptor 29 with internal thread 30 on the spindle by means of screw 31. (ref. FIGS. 9 & 10)

Figure 11:
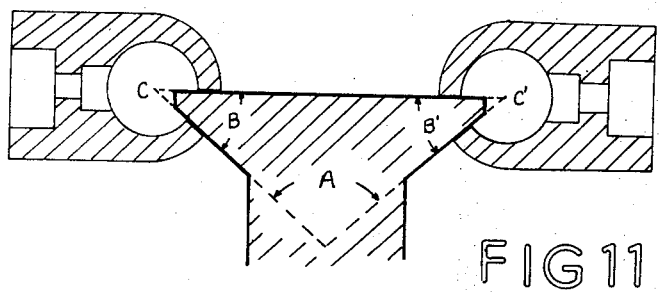
FIG. 11 is an enlarged cutaway view of a set of theoretical outside diameter anvils and a countersunk head bolt in the measuring position, showing a theoretical outside diameter of the head and the angle relationship in the theoretical triangle.

There is a set angle between the two contact surfaces 23 & 24 according to the angle of the head of a countersunk head bolt. (ref. FIGS. 8 & 11) There are countersunk head bolts of 60° to 100° included angles. A set of theoretical outside diameter anvils with 40° angle (B & B') between the two contact surfaces are used for 100° include angle A countersunk head bolt, 45° angle anvils for 90° include angle bolt, 50° angle anvils for 80° include angle bolt, 55° angle anvils for 70° include angle bolt, and 60° angle anvils for 60° include angle bolt. (ref. FIG. 11) Anvils of different angles are interchanged by means of attaching screw, recess and adoptor. FIG. 11 is a cutaway view of a set of 40° angle theoretical outside diameter anvils and a 100° include angle countersunk head bolt in the measuring position, showing a theoretical outside diameter (C—C') of the head.

I claim:

1. A micrometer or dial indicating comparator for measuring linear distances having opposing coaxial measuring elements mounted in a frame and movable toward each other to measure the dimension of a workpiece between said elements, adaptor anvils for use in measuring an outside head diameter of a countersunk head bolt, said anvils being mounted one on opposing ends of said elements, said anvils each having a cylindrical hollow passing transversely through each anvil, a top planar contact surface extending in a plane parallel to the axis of movement of the elements, and a second contact lying in a plane intersecting the plane of the top contact surface along a line within the hollow interior of said anvil, the angle between these planes being equal to the angle of the edge of the bolt head to be measured, whereby the theoretical diameter of the bolt head may be measured by placing the bolt head between the two anvils with the top planar contact surfaces resting on the top of the bolt head and the second contact surfaces contacting the inclined under surface of the bolt head.

* * * * *